United States Patent [19]

Gorin et al.

[11] 3,906,080

[45] Sept. 16, 1975

[54] REMOVAL OF SULFUR DIOXIDE FROM GASES CONTAINING SULFUR DIOXIDE AND OXYGEN

[75] Inventors: Everett Gorin; Metro D. Kulik; Robert T. Struck, all of Pittsburgh, Pa.

[73] Assignee: Consolidation Coal Company, Pittsburgh, Pa.

[22] Filed: Aug. 19, 1974

[21] Appl. No.: 498,683

Related U.S. Application Data

[63] Continuation-in-part of Ser. No. 309,869, Nov. 27, 1972, abandoned, which is a continuation-in-part of Ser. No. 222,760, Feb. 2, 1972, abandoned.

[52] U.S. Cl. .............................. 423/242; 423/512
[51] Int. Cl.$^2$ ........................................ C01B 17/00
[58] Field of Search ......................... 423/242–244, 423/512, 514

[56] References Cited

UNITED STATES PATENTS

| | | | |
|---|---|---|---|
| 2,729,543 | 1/1956 | Keller | 423/242 |
| 3,431,070 | 3/1969 | Keller | 423/514 |
| 3,635,820 | 1/1972 | Urban | 423/242 |
| 3,644,087 | 2/1972 | Urban | 423/242 |

*Primary Examiner*—Oscar R. Vertiz
*Assistant Examiner*—Gregory A. Heller
*Attorney, Agent, or Firm*—William A. Mikesell, Jr.; D. Leigh Fowler, Jr.

[57] ABSTRACT

An improvement in the selective removal of $SO_2$ from gases containing $SO_2$ and $O_2$ wherein a thiosulfate-rich aqueous solution containing a sulfite-forming additive is used as the selective $SO_2$ absorbent, whereby a gas of substantially reduced $SO_2$ content and a substantially unchanged $O_2$ content is obtained.

5 Claims, 1 Drawing Figure

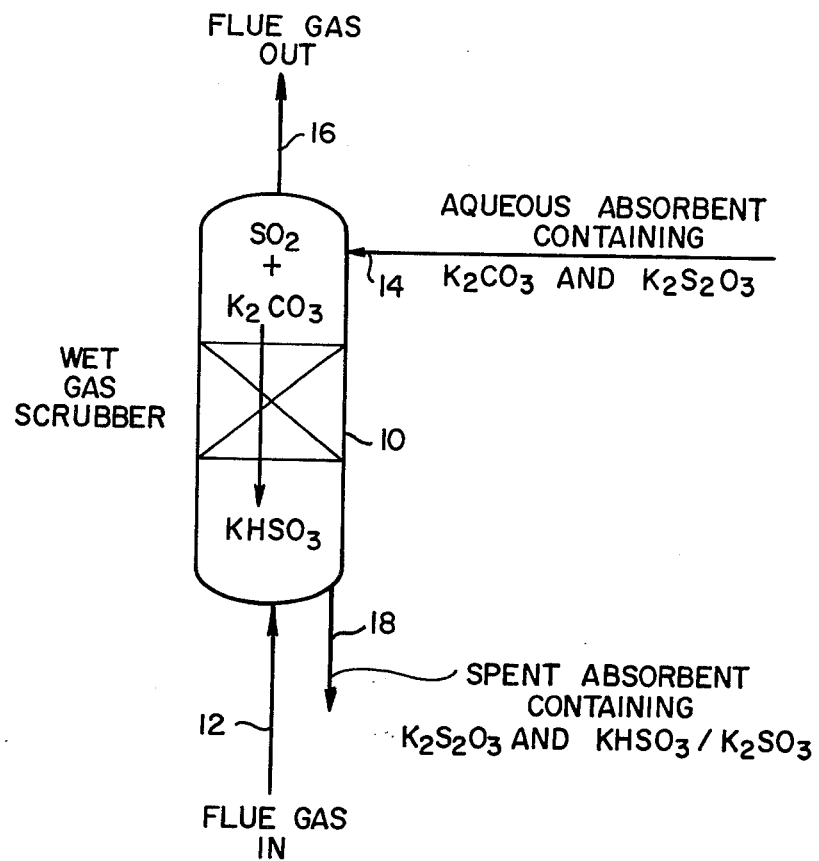

REMOVAL OF SULFUR DIOXIDE FROM GASES CONTAINING SULFUR DIOXIDE AND OXYGEN

CROSS REFERENCE TO RELATED APPLICATIONS

This application is a continuation-in-part of application Ser. No. 309,869, filed Nov. 27, 1972, and now abandoned which in turn is a continuation-in-part of application Ser. No. 222,760, filed Feb. 2, 1972 and now abandoned, both assigned to the assignee of the present application.

BACKGROUND OF THE INVENTION

1. Field of the Invention

The present invention relates to the treatment of gases containing sulfur dioxide and oxygen, and more particularly, to an improvement in those processes for removal of sulfur dioxide which use an aqueous absorbent containing a sulfite-forming additive in approximately the amount required to convert the sulfur dioxide to sulfite. The term "sulfite," as used in the specification and the claims, refers to both the sulfite and bisulfite form of the anion.

2. Description of the Prior Art

The prior art on sulfur dioxide removal from flue gases by means of aqueous absorbents containing sulfite-forming additives is extensive. The sulfite-forming additives that are generally considered for the removal of sulfur dioxide are such materials as the oxides, hydroxides and carbonates of alkali and alkaline earth metals, as well as ammonia and its derivatives. The absorption of sulfur dioxide ($SO_2$) by suitable contact of an $SO_2$—containing gas phase with an aqueous solution or slurry containing such additives is both rapid and efficient, provided certain conditions are satisfied. Efficient absorption depends upon operating with scrubbing solutions which contain a low equilibrium vapor pressure of $SO_2$ over them. Such a condition is reached when the concentration of the product sulfite is relatively low, i.e. less than about five weight percent, and when the pH is relatively high, i.e. greater than about 5.5–6.0.

Rapid absorption can be achieved, in general, by operating with scrubbers of proper design which provide adequate contact area between the liquid and the gas and in which turbulent flow conditions are maintained.

The most serious difficulty associated with the use of the above-cited absorbents is the formation of sulfates in the scrubber. Presumably, such sulfates result from reaction of the oxygen contained in the flue gas with the sulfites, either sulite or bisulfite. In any case, the sulfate content of the absorbent builds up in any regenerative system, that is one where the additive is regenerated for reuse in the scrubber. To prevent such build-up, a portion of the absorbent must be discarded, thus causing a waste of useful absorbent.

The primary object of the present invention is to provide an improvement in the processes of the type described which alleviates the problem of sulfate formation. Patents which may be considered pertinent to our improvement, although not, in our opinion, suggestive thereof are: British Pat. Nos. 134,943 and 459,418, and U.S. Pat. Nos. 1,795,121; 3,523,755; and 3,644,087. Of the aforementioned patents, U.S. Pat. No. 3,644,087 is perhaps the most pertinent. The gist of the invention disclosed in this patent is stated in lines 70 to 75 of Col. 2 and lines 1–4 of Col. 3 as follows:

"Against this background, the improvement of the present invention involves: adding to the scrubbing zone a reducing agent selected from the group consisting of finely divided sulfur, a polysulfide compound, a water-soluble sulfide compound and mixtures thereof; and thereafter, operating the scrubbing zone under thiosulfate production conditions selected to react the reducing agent with the water-soluble sulfite compound as it is formed to produce the corresponding thiosulfate compound, thereby suppressing the production of undesired sulfate by-products."

SUMMARY OF THE INVENTION

The improved process of the present invention is based upon the discovery that the amount of sulfate formed in the scrubber is dramatically reduced if the aqueous absorbent solution entering the scrubber contains at least 15 weight percent of alkali metal thiosulfate in the solution; and is reduced to zero as the concentration of thiosulfate approaches 50 weight percent. The feed gas leaves the scrubber substantially free of $SO_2$ with its $O_2$ content substantially unchanged. The sulfite produced by the reaction of $SO_2$ and the additive in the absorbent also leaves the scrubber substantially unchanged, that is, as sulfite.

Accordingly, the present invention provides an improvement in those processes for removing $SO_2$ from gases containing $SO_2$ and $O_2$ which use an aqueous absorbent containing a sulfite-forming additive selected from the class consisting of alkali metal hydroxides and carbonates and ammonium hydroxide and carbonate. The improvement is the use of a thiosulfate-rich aqueous solution as the vehicle or carrier for the sulfite-forming additive. The particular thiosulfate used is preferably one having the same cation as that of the sulfite-forming additive.

The concentration of the thiosulfate in the aqueous absorbent must be at least 15 percent by weight of the solution to obtain the desired reduction in sulfate formation in the scrubber. The amount of the sulfite-forming additive is at least that required to convert the $SO_2$ to sulfite, and is generally less than 2 percent by weight of the fresh absorbent solution entering the scrubber. It is apparent, therefore, that the thiosulfate is the principal component and the sulfite-forming additive is a minor component. In some instances, other solutes may be added to serve special purposes. The maximum concentration of thiosulfate that is suitable is set by its solubility limit at the operating conditions. This can be as high as 75 weight percent of the total absorbent solution for the more soluble salts such as potassium thiosulfate. However, it is possible to operate above the solubility limit of the thiosulfate, but the insoluble portion is transported through the scrubber as a slurry. Generally, this mode of operation is not advantageous or necessary.

The pH maintained in the scrubber must be at least 6. If below 6, sulfate formation may occur as a result of decomposition of the thiosulfate. The pH may be regulated by suitable adjustment of the concentration of the alkali in the absorbent solution entering the scrubber, as well as by adjustment of the relative flow rates of gas and absorbent solution.

A series of experiments was conducted which demonstrated the effect of thiosulfate concentration on the formation of sulfate when aqueous potassium carbonate was used as the $SO_2$ absorbent. The experiments were conducted at 60°C. and a pH between 6 and 8. The percent by weight of $K_2S_2O_3$ in the aqueous absorbent ranged from 0% to 52.3%. The feed gas contained, in volume percent, approximately 1% $SO_2$, 7.5% $O_2$, 15% $CO_2$, and the balance $N_2$. Complete absorption of $SO_2$ was achieved in each experiment. At 0% thiosulfate concentration, the rate of sulfate production [expressed as gm. mol/hr $\times$ L $\times$ atm. $O_2$ (where L is 'liter of solution')] was 7.20; at 14.1% thiosulfate concentration, the rate of sulfate production was 0.70; at 16.7%, the rate was 1.74; at 19.8%, the rate was 2.46; at 36.7%, the rate was 0.25; and finally at 50.5 and 52.3%, the rate was 0.00. (The lack of precise reproducibility at 14 to 20% concentration was due to inability to precisely control flow rates of gas and liquid).

PREFERRED EMBODIMENT

The flowsheet submitted herewith represents a preferred embodiment of the improved process of this invention. The sulfite-forming additive which we prefer to use is potassium carbonate, $K_2CO_3$, alone or in admixture with $KHCO_3$, because of the high solubility of potassium thiosulfate, $K_2S_2O_3$, in water. However, the other alkali metal carbonates as well as hydroxides may be used, including ammonium hydroxide or carbonate which is equivalent thereto.

Referring to the drawing, a gas stream containing $SO_2$ and $O_2$, e.g. a flue gas, is introduced into the bottom of the absorber or scrubber tower 10 through an inlet gas line 12. The composition of a typical flue gas from a coal-fired power station using coal with a sulfur content of 2.46 weight percent of the moisture-free coal is as follows, in volume percent: 74.63% $N_2$, 13.98% $CO_2$, 3.30% $O_2$, 0.17% $SO_2$, and 7.92% $H_2O$. The scrubber 10 may be, for example, a conventional countercurrent packed tower, spray tower, or other conventional scrubbing apparatus. Aqueous absorbent containing the sulfite-forming additive and the thiosulfate is continuously fed through a conduit 14 into the top of the tower 10. The composition of the absorbent fed through conduit 14 during normal operation is, for example, 55 percent by weight of $K_2S_2O_3$ and from 0.2 to 1.0 percent or more by weight of $K_2CO_3/KHCO_3$, depending upon the $SO_2$ content of the flue gas, as well as the relative flow rates of gas and liquid. The flue gas is preferably passed upwardly in countercurrent flow to the aqueous absorbent which enters the top of the tower. In such a countercurrent system, the gas flow may suitably be 6 to 10 ft/sec. linear velocity based upon the empty cross-section of the tower. The liquid flow is suitably 2 to 50 gal/1000 scf. The temperature within the tower is preferably maintained, by any suitable means, between 125° and 160°F. The principal reactions occurring in the scrubber are the following:

1. $K_2CO_3 + SO_2 = K_2SO_3 + CO_2$
2. $K_2SO_3 + SO_2 + H_2O = 2\ KHSO_3$

The pH is maintained between 6.0 and 8.0, and preferably between about 6.3 and 8.0, and most preferably between about 6.3 and 7.3, in the liquid stream leaving the tower through line 18. The liquid entering the tower through line 14 generally will be from 0.2 to 0.8 units higher in pH depending on the liquid circulation rate.

The flue gas leaves the scrubber 10 through a stack 16 substantially free of $SO_2$ and substantially unchanged as to $O_2$ content. The effluent stream leaving the bottom of the scrubber through conduit 18 contains essentially no $K_2CO_3$ but may contain up to 0.1 weight percent $KHCO_3$. $K_2S_2O_3$ and $KHSO_3/K_2SO_3$ are the principal components. The proportions of the sulfite to bisulfite increase with pH. At a pH of 7.0, the molar ratio of bisulfite to sulfite is approximately one. The $K_2S_2O_3$ concentration remains essentially unchanged from that of the feed absorbent, namely 55 weight percent. The sulfite concentration is less than 2 weight percent. If regeneration of the absorbent is desired, a suitable regeneration process is that disclosed in the noted application, Ser. No. 222,760, cited above.

According to the provisions of the patent statutes, the principle, preferred construction, and mode of operation of the invention have been explained and what is considered to represent its best embodiment has been illustrated and described. However, it should be understood that, within the scope of the appended claims, the invention may be practiced otherwise than as specifically illustrated and described.

We claim:

1. In a process for removing sulfur dioxide from a gas stream containing $SO_2$ and $O_2$ in which said gas stream is contacted in a scrubber with an aqueous solution containing a sulfite-forming reagent selected from the class consisting of alkali metal hydroxides and carbonates and ammonium hydroxide and carbonate in at least the amount required to convert the $SO_2$ to sulfite at scrubbing conditions which are selected to promote reaction of the $SO_2$ with the sulfite-forming reagent, to thereby yield an effluent gas stream of reduced sulfur dioxide content and an effluent aqueous solution containing alkali metal or ammonium sulfite, the IMPROVEMENT which comprises:
   a. introducing fresh aqueous scrubbing solution into said scrubber which contains, in addition to said sulfite-forming reagent, at least 15 percent by weight of an alkali metal or ammonium thiosulfate; and thereafter
   b. operating the scrubber at conditions selected to maintain the pH of the solution leaving the scrubber between 6.3 and 8.0, and to yield an effluent gas stream which is substantially free of $SO_2$ and an effluent aqueous scrubbing solution which contains substantially all the sulfite produced in the scrubber by the reaction of $SO_2$ and the sulfite-forming reagent.

2. A process according to claim 1 in which the sulfite-forming reagent is an alkali metal carbonate and the thiosulfate is an alkali metal thiosulfate.

3. A process according to claim 2 in which the concentration of the sulfite-forming reagent is less than two percent by weight of the fresh solution entering the scrubber and the concentration of the thiosulfate in the same solution is between 15 and 75 percent by weight.

4. A process according to claim 3 wherein said pH is maintained between about 6.3 and 7.3.

5. A process for removing $SO_2$ from a gas stream containing $SO_2$ and $O_2$ which comprises:
   a. passing said gas stream through a scrubber which is maintained between 125° and 160°F.;
   b. circulating an aqueous solution through said scrubber in intimate contact with said gas stream, said aqueous solution containing potassium carbonate in at least the amount required to convert the $SO_2$ in the gas stream to sulfite;

c. maintaining in said aqueous solution throughout its passage through said scrubber potassium thiosulfate having a concentration of at least 15 percent by weight of said solution;

d. maintaining the pH of the aqueous solution leaving the scrubber between 6.3 and 8.0;

e. withdrawing the effluent gas stream from said scrubber substantially free of $SO_2$; and f. withdrawing the effluent aqueous solution from said scrubber with substantially all the sulfite produced in the scrubber by the reaction of $SO_2$ and the potassium carbonate.

* * * * *